United States Patent [19]

Ulrich et al.

[11] 4,308,477

[45] Dec. 29, 1981

[54] STARTING RESISTANCE FOR A ROTATING ELECTRICAL MACHINE

[75] Inventors: Urban Ulrich, Fislisbach; Beat Zimmerli, Kehrsatz, both of Switzerland

[73] Assignee: BBC Brown Boveri & Company, Limited, Baden, Switzerland

[21] Appl. No.: 95,240

[22] Filed: Nov. 19, 1979

[30] Foreign Application Priority Data

Dec. 22, 1978 [CH] Switzerland ............ 13072/78

[51] Int. Cl.³ ........................................... H02K 11/00
[52] U.S. Cl. ................................. 310/68 B; 310/72; 338/299
[58] Field of Search ............ 310/68 R, 68 B, 68 E, 310/72, 71; 338/296, 298, 299, 302

[56] References Cited

U.S. PATENT DOCUMENTS

| | | | |
|---|---|---|---|
| 1,216,397 | 2/1917 | Bailey | 310/72 UX |
| 1,624,775 | 4/1927 | Bovard | 310/72 UX |
| 1,627,949 | 5/1927 | Baker | 310/72 |
| 3,575,622 | 4/1971 | Nielson | 310/72 |
| 3,667,014 | 5/1972 | Merhof | 318/715 |
| 4,038,628 | 7/1977 | Salemi | 338/296 |

OTHER PUBLICATIONS

"Synchronous Motors Can Be Brushless;" Hanson et al.; Power Publ., 2/1965.

*Primary Examiner*—R. Skudy
*Attorney, Agent, or Firm*—Burns, Doane, Swecker & Mathis

[57] ABSTRACT

A rotating starting resistance for a rotating electrical machine is disclosed. The resistance includes a helicoidal resistance wire that is wound in the shape of a torus, and connected to the rotating shaft of the electrical machine. The resistance wire may be directly fastened to a supporting member by means of a glass fiber cord suitably impregnated with a synthetic resin. The helicoidal nature of the starting resistance permits efficient cooling, and allows minimization of the overall height of the resistance. The resistance wire, which is wound in the shape of a helicoidal torus, may be reinforced at either the inner or outer diameter of the torus.

13 Claims, 5 Drawing Figures

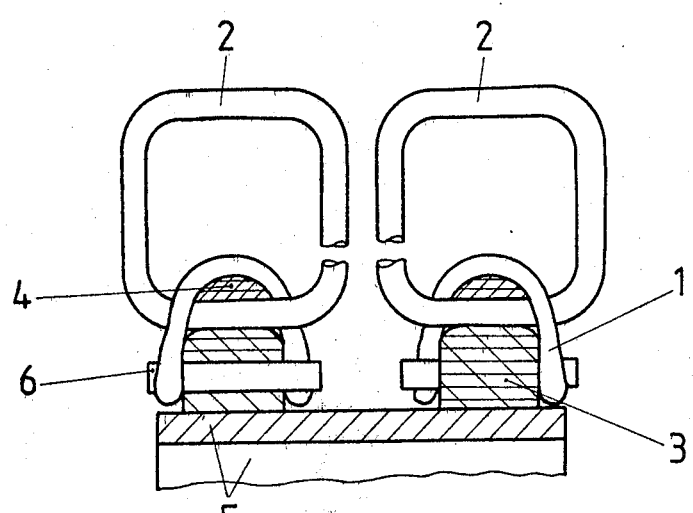
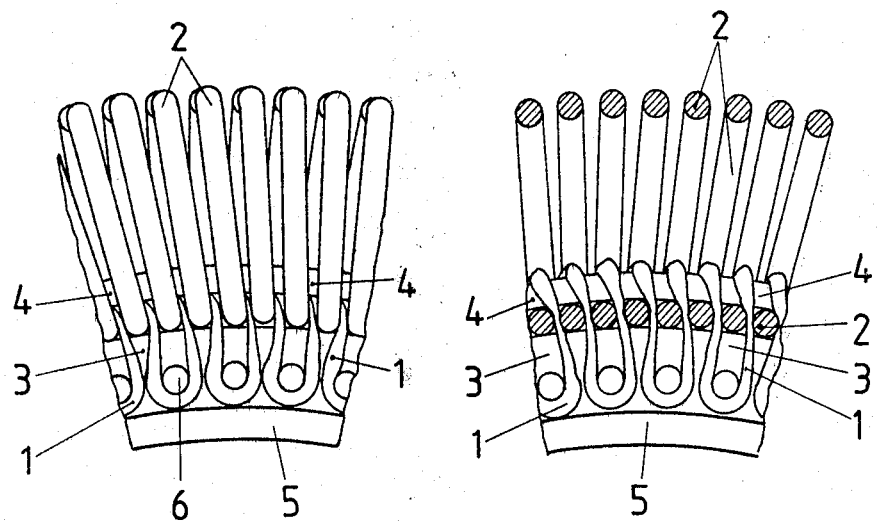

STARTING RESISTANCE FOR A ROTATING ELECTRICAL MACHINE

BACKGROUND OF THE INVENTION

This invention relates generally to rotating electrical machines, and more particularly to rotating starting resistances for electrical machines, which rotate with the rotating member of the electrical machine.

Rotating starting resistances, which are connected in a series or field circuit to modify the starting performance of electrical machines, are known in the art. See, for example, "Brown Boveri Mitteilungen" [Brown Boveri Reports], Volume 54, No. 9, at page 550, and "Dreiphasen-Synchronmotoren Typ WM 400 ... 1000 4-Bis 14 Polig" [Three-Phase Synchronous Motors, Type WM 400 ... 1000 4-to 14 Pole], CH-T5432, BBC Aktiengesellschaft Brown, Boveri & Cie., Baden, Switzerland, FIG. 8b at page 12.

A conventional starting resistance is manufactured in the form of a coiled strap of resistance material, such as steel or German silver. The coiled strap is then insulated with an insulating strip. This form of resistance, however, cannot be effectively cooled due to the insulation. Moreover, this type of construction requires the starting resistance to have a relatively large overall height.

It is therefore an object of this invention to provide a rotating starting resistance for an electrical machine which can be more effectively cooled, and which has a relatively smaller overall height than conventional rotating starting resistances.

According to a preferred embodiment of the present invention, the starting resistance is constructed from a helicoidal winding of resistance wire which is wound in the shape of a torus. The starting resistance is then mechanically connected to the rotating shaft of the electrical machine by suitable supporting elements. The resistance wire can be made from such materials as steel, German silver or a nickelchromium alloy.

The helicoidal nature of the resistance wire used to form the starting resistance allows effective cooling of the resistance, and allows a resistance of a given resistance value and thermal capacity to be constructed having a minimum overall height.

BRIEF DESCRIPTION OF THE DRAWINGS

The preferred embodiments of the invention are described with reference to the accompanying drawings wherein like members bear like reference numerals, and wherein:

FIG. 1 is an elevational view, partially in cross-section, illustrating one embodiment of a starting resistance according to the present invention;

FIG. 2 is a side view of the embodiment illustrated in FIG. 1;

FIG. 3 is a cross-sectional view of the embodiment illustrated in FIG. 2;

DETAILED DESCRIPTION OF THE PREFERRED EMBODIMENTS

Figure 4:
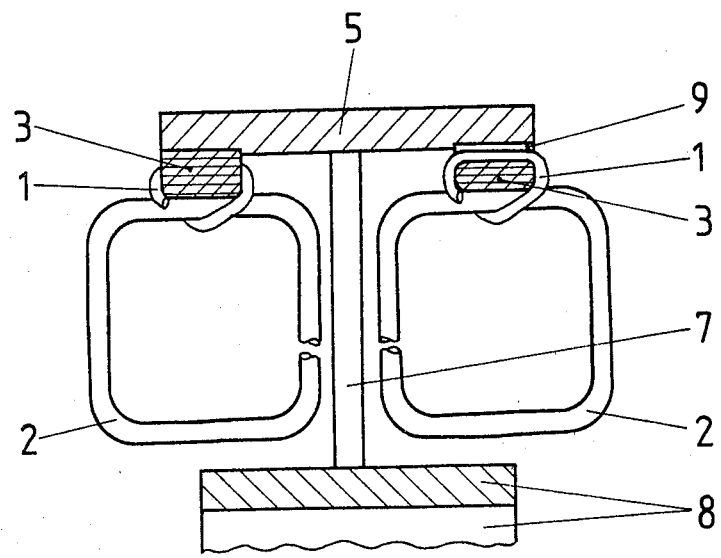
FIG. 4 is an elevational view, partially in cross-section, illustrating a second embodiment of a starting resistance according to the present invention.

Referring to FIG. 1, a starting resistance for a rotating electrical machine includes two resistance wire elements 2. Each resistance wire element 2 is an helicoidal wire manufactured from a nickel-chromium alloy (80% Ni, 20% Cr). The resistance wire element 2, which is only partially illustrated in FIG. 1, is connected by a cord or strap 1 and pins 6 to an annular fastener 3. The annular fastener 3, in turn, is fastened to a supporting member 5, which is connected to the rotating shaft of the electrical machine.

As illustrated in greater detail in FIGS. 2 and 3, the cord 1 is inserted between adjacent helicoidal turns of the resistance wire element 2, and about the pins 6 accomodated in the annular fastener 3. The resistance wire element 2 includes an inner zone which lies against the annular fastener 3. Preferably, an annular washer 4 is included within the torus of the helicoidal resistance element. The cord 1 is wound about the annular washer 4 and the pins 6 in such a manner that the inner zone of the resistance wire element 2 is squeezed between the annular fastener 3 and the annular washer 4. In this manner, the cord 1 separates and insulates the individual windings of the resistance wire at the inner zone of the element 2.

In the embodiment illustrated in FIG. 1-3, the annular fastener 3, the pins 6 and the resistance wire are all readily accessible during assembly of the starting resistance.

Referring to FIG. 4, a starting resistance for a rotating electrical machine includes an annular fastener 3 and a resistance wire element 2 having an outer zone which lies against the annular fastener 3. The outer zone of the resistance wire element 2 has a larger diameter than the inner zone of the toroidally shaped resistance element.

In this embodiment, the annular fastener 3 is fastened to an annular supporting member 5. A cross-member 7 connects the supporting member 5 to a supporting sleeve 8 which is directly mechanically connected to the shaft of the rotating electrical machine.

The annular fastener 3 includes slots 9 which accomodate the cord 1. The cord 1, which is inserted between adjacent helicoidal turns of the resistance wire and into the slots 9, fastens the resistance wire to the annular fastener 3. The cord 1 separates and insulates the individual windings of the resistance wire at the outer zone.

Figure 5:
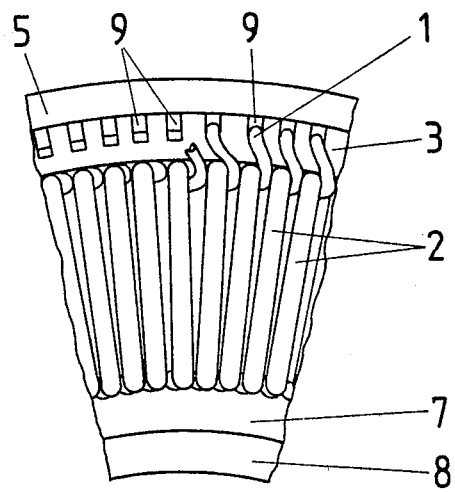
FIG. 5 is a side view of the embodiment illustrated in FIG. 4.

In the embodiment of the present invention illustrated in FIGS. 4 and 5, the supporting member 5 and the annular fastener 3 absorb the centrifugal forces imparted to the resistance wire element as the starting resistance rotates. Therefore, the cord 1 can have a relatively lesser strength in this embodiment of the invention as compared to the embodiment illustrated in FIGS. 1-3 wherein the centrifugal forces are applied to the cord 1.

The cord 1 is preferably a glass fiber cord or glass fiber strap. Most preferably, the cord 1 is impregnated with a heat resistant synthetic resin.

According to a preferred embodiment of the invention, the annular fastener 3 is made from a plastic. Most preferably, the annular fastener is made from a mechanically stable, heat-resistant material which has good electrical insulating properties. For example, the annular fastener may be made from a synthetic resin such as polyimide, polyesterimide, amidimide or phenoxy resin. Additionally, these synthetic resins may be used to impregnate the cord 1.

The principles, preferred embodiments and modes of operation of the present invention have been described in the foregoing specification. Modifications and variations of the present invention are possible in light of the above teachings. For example, the slots 9 included on the annular fastener 3 of the embodiment illustrated in FIGS. 4 and 5 may be used for directly supporting the resistance wire element 2. It is therefore to be understood that within the scope of the appended claims the invention may be practiced otherwise than as specifically described, and that all the matter contained in the above description and shown in the accompanying drawings shall be construed as illustrative and not in a limiting sense.

What is claimed is:

1. A starting resistance, for a rotating electrical machine having a rotating shaft, comprising:
    an annular supporting sleeve member mounted directly on the shaft of the electrical machine;
    an annular member mechanically fastened to said supporting member;
    a helicoidal starting resistance element mechanically fastened to said annular member so as to form a torus coaxial with and surrounding the shaft, whereby the starting resistance element rotates together with the shaft of the rotating electrical machine; and
    fastening means inserted between adjacent helicoidal windings of said resistance element for mechanically fastening said resistance element to the annular member.

2. The starting resistance according to claim 1 wherein the fastening means comprises a glass fiber cord.

3. The starting resistance according to claim 2 wherein said cord is impregnated with a heat resistant synthetic resin.

4. The starting resistance according to claim 3 wherein said resistance element is made from one of the materials comprising the group of steel, nickel, silver and a nickel-chromium alloy.

5. The starting resistance according to claim 1 wherein the annular member comprises a plastic.

6. The starting resistance according to claim 1 wherein the helicoidal starting resistance element includes an inner zone of a first diameter and an outer zone of a second diameter, said inner and outer zones being substantially coaxial one with the other, and wherein said starting resistance is connected to said annular member such that said inner zone and outer zone are substantially coaxially situated with respect to the shaft of the rotating machine.

7. The starting resistance according to claim 6 wherein the inner zone of said starting resistance element is mechanically fastened to said annular member.

8. The starting resistance according to claim 6 wherein the outer zone of said starting resistance element is mechanically fastened to said annular member.

9. The starting resistance according to claim 8 wherein the annular member includes a means for accomodating said fastening means.

10. The starting resistance according to claim 9 wherein said accomodating means comprises a pin element.

11. The starting resistance according to claim 9 wherein said accomodating means includes a slot.

12. The starting resistance according to claim 6 further comprising:
    an annular washer situated within the torus of the helicoidal starting resistance element, said washer being substantially coaxially situated between the inner and outer zones of said resistance element, and
    wherein said washer is mechanically connected to the annular member.

13. A rotating starting resistance for a rotating electrical machine comprising:
    a helicoidal wire resistance element wound in the shape of a torus;
    an annular supporting member mounted on a rotating member of the electrical machine for rotation therewith;
    means for mechanically fastening said resistance element to said supporting member coaxially with the rotating member, said fastening means being inserted between adjacent helicoidal windings of said resistance element; and
    means included on said annular supporting member for accomodating said fastening means.

* * * * *